United States Patent [19]

Maeda et al.

[11] 3,816,909

[45] June 18, 1974

[54] METHOD OF MAKING A WIRE MEMORY PLANE

[75] Inventors: Yo Maeda, Shimodate; Tamotsu Ueyama, Oyama; Naoki Fukutomi, Shimodate, all of Japan

[73] Assignee: Hitachi Chemical Company, Ltd., Tokyo, Japan

[22] Filed: May 30, 1972

[21] Appl. No.: 257,905

Related U.S. Application Data

[62] Division of Ser. No. 32,528, April 28, 1970, abandoned.

[30] Foreign Application Priority Data

Apr. 30, 1969 Japan .............................. 44-33446

[52] U.S. Cl. ............ 29/604, 29/625, 340/174 MA, 340/174 BC, 340/174 PW

[51] Int. Cl. ............................................ H01f 7/06

[58] Field of Search ....... 29/604, 625; 340/174 MA, 340/174 BC, 174 PW

[56] References Cited

UNITED STATES PATENTS

| | | | |
|---|---|---|---|
| 3,553,648 | 1/1971 | Gorman et al. | 340/174 PW |
| 3,585,616 | 6/1971 | Mazzeo | 340/174 BC |
| 3,648,362 | 3/1972 | Oshima et al. | 29/604 |
| 3,699,619 | 10/1972 | Yasuda et al. | 29/604 |
| 3,727,304 | 4/1973 | Granato et al. | 29/604 |

OTHER PUBLICATIONS

Anacker, "Memory Device . . . Keeper," IBM Tech. Discl. Bull., Vol. 8, No. 11, 4/66, pages 1615–1616.

McNichol, "Fabrication . . . Keeper," IBM Tech. Discl. Bull., Vol. 8, No. 9, 2/66, pp. 1278–1279.

*Primary Examiner*—Charles W. Lanham
*Assistant Examiner*—Carl E. Hall
*Attorney, Agent, or Firm*—Craig & Antonelli

[57] ABSTRACT

Disclosed is an improved wire memory plane, in which a memory matrix with a keeper is composed by perpendicularly arranging groups of word strips which comprise, on the back and two side surfaces of the word strip, a keeper made of a high magnetic permeability material and having a rectangular shape with one arm removed.

4 Claims, 6 Drawing Figures

INVENTORS
YO MAEDA, TAMATSU UEYAMA and
NAOKI FUKUTOMI
BY Craig, Antonelli, Stewart & Hill
ATTORNEYS

METHOD OF MAKING A WIRE MEMORY PLANE

BACKGROUND OF THE INVENTION

1. Field of the Invention:

This is a division, of application Ser. No. 32,528 filed Apr. 28, 1970 now abandoned.

This invention relates to a wire memory plane having a high output and a high memory density and a method of making the same.

2. Description of the Prior Art

A wire memory plane is a magnetic memory device, in which a wire plated with a uniaxial-anisotrophy permalloy (hereinafter referred to as plated wire) is used for a digit wire and a word line is crossed perpendicularly thereover to form a matrix.

In this wire memory, a magnetic flux keeper is used to enhance the efficiency of the word current magnetic field, reduce the disturbance by the adjacent memory and to obtain high memory density.

In contrast to a ferrite core memory, a magnetic field indicated by a word current on the plated wire forms an open magnetic path. Thus, it is difficult to concentrate the magnetic field due to the influence of the reducing magnetic field. Moreover, most of the magnetomotive force for driving is consumed by the space in the magnetic path and only a small part is given to the plated wires of the memory element.

In order to obviate the deficiencies described above, a magnetic flux keeper is employed in which the space in the magnetic path is filled with a material of high permeability (for example, ferrite, permalloy etc.) to focus the magnetic field and to reduce the magnetomotive force for driving.

Various forms of keepers have been tested up to now and it is known that a keepers ability is remarkably influenced by its form and structure.

Typical conventional examples are shown in FIGS. 1 to 3. FIG. 1 shows a matrix structure which is formed by sticking a group of word strips 2 (hereinafter referred to as a word sheet) made by etching a flexible copper film around an insulating sheet 1 (hereafter referred to as a tunnel sheet) comprising a hole into which a plated wire may be inserted.

The keeper comprises the structure, wherein sheets of high magnetic permeability material 3 are folded about the word sheet 2. Reference numeral 4 indicates an insulating sheet.

Since a gap corresponding to the thickness of the word strip and the insulating layer is present between the plated wire and the keeper in this structure, the magnetic path has a large magnetic resistance against a driving magnetic force, and the effective driving magnetic force increases only by about 20 percent when a keeper is used compared with the case where a keeper is not used.

Further, it is difficult to increase the memory density because of the magnetic field leakage from the gap magnetic field.

FIG. 2 also shows a device in which a magnetic plated wire is used for a memory element. Reference numeral 5 indicates a conductor substrate, 6 indicates a continuous foil keeper, 7 indicates an insulating film, 8 a magnetic plated wire, 9 a word strip and 10 a side keeper. In this device, a continuous permalloy foil keeper is provided at the outside and a side keeper is provided at the center of the word strip. This device has a better efficiency than the one shown in FIG. 1 because a side keeper is added. However, such a structure is hard to make, the distance between word strips becomes larger because of the presence of a side keeper, and thus it is impossible to enhance the memory density.

FIG. 3 shows a device, in which a word wire 12 except the part contacting a plated wire 11 is completely surrounded by a keeper 13. This device is the most efficient one, but it is difficult to make a plane having such a structure.

SUMMARY OF THE INVENTION

An object of this invention is to provide a method of making a wire memory plane, wherein a memory matrix with a keeper is composed by perpendicularly arranging a group of digit wires and a group of word strips having on the back and two side surfaces thereof high magnetic permeability keepers of a rectangular shape with one arm removed. According to the method of this invention, a word sheet having a keeper of a rectangular shape with one arm removed can be easily formed around a word strip by permalloy plating. The memory core plane made of such word sheets enable a high output and a high memory density.

DESCRIPTION OF THE PREFERRED EMBODIMENT

Figure 4:
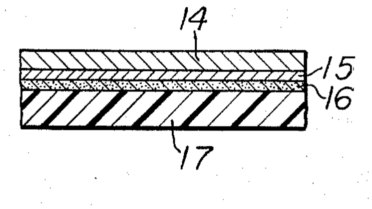
FIGS. 4 and 5 are sectional diagrams showing a method of making a word strip according to one embodiment of this invention.
Figure 2:
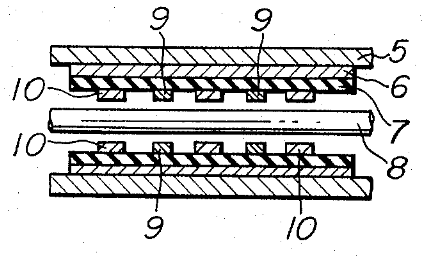
FIG. 2 PRIOR ART
FIG. 2 shows a sectional diagram of another conventional wire memory plane.
Figure 5:
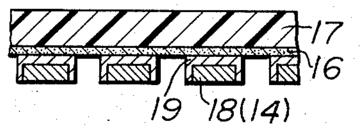
Figure 3:
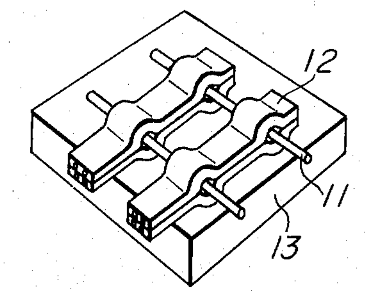
FIG. 3 PRIOR ART
FIG. 3 is a partial perspective view of a further example of a conventional wire memory plane.

Now, an embodiment of this invention will be explained with reference to FIGS. 4 to 6. This invention relates to a method of assembling a memory plane by using word sheets made by the following processes:

1. One whole surface of a copper foil 14 of a suitable thickness (for example, 35 $\mu$, 75 $\mu$ etc.) is plated with permalloy 15 or permalloy foil 15 is plated with copper 14, a binding agent 16 is applied to one side of the permalloy layer and this side is attached to the polyethylene terephthalate, polyamide film 17 etc. to form a flexible copper-coated foil film.

2. This flexible copper-coated film is etched by a conventional etching method (the part for a word strip is protected by a resist and the other parts are etched) to form many word wires 18.

3. After etching, only the side surface of a word wire 18 is plated by permalloy to form a keeper 19 of a rectangular shape with one arm removed as shown in FIG. 5. This keeper is actually formed by permalloy plating before removing the resist formed in the process 2, i.e., in the state where only a side surface of a word strip is exposed. Then, the permalloy layers on the back and side surfaces connect to each other and the keeper is formed. Then the resist itself is eliminated. The word sheet formed in this way and the tunnel sheet are fixed together and a magnetic plated wire is inserted to form a memory plane.

Figure 6:
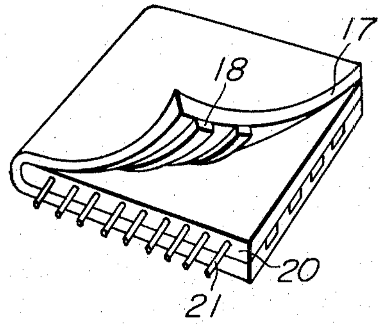
FIG. 6 is a partial perspective view of a wire memory plane obtained by the method of this invention.

FIG. 6 shows the wire memory plane formed in this way. In the figure, 20 indicates a tunnel sheet and 21 indicates a magnetic plated wire.

EMBODIMENT

A cooper foil of 35 $\mu$ is cut square by 500 mm and sensitizer TPR (TOKYO OKA Co. Ltd.) is applied to both surfaces by a dipping method. One whole surface is exposed to a mercury-lamp sintering machine and developed. The foil, where a copper foil surface is exposed on one surface, is plated with permalloy by use of a conventional permalloy bath (main component $NiSO_4$, $FeSO_4$, $H_2SO_4$, $H_3BO_3$). Plating is carried out for thirty minutes with a current density of 3 A/100 $cm^2$, a permalloy film of about 15 $\mu$ is obtained. A saturated polyester binding agent is applied to the side of the permalloy layer of the permalloy plated copper foil and the foil is dired at 50°C for thirty minutes. The same binding agent is applied to Mylar of 70 $\mu$ in thickness and dried at 50°C for thirty minutes. The coper foil and the Mylar are folded, inserted between stainless plates and pressed under heat at 130°C for one hour. Thus, a flexible copper-coated film is obtained. After polishing and trichlene cleaning the flexible copper-coated film, TPR of about 3 $\mu$ in thickness is applied and dried, and the word wire pattern is sintered.

After development and drying, the film is photo-etched with ferrous chloride, after cleansing the film with water, the film is rinsed with dilute sulfuric acid to eliminate the ferrous chloride completely. Then permalloy plating is done with a current density of 3 A/100 $cm^2$ for thirty minutes after which the resist is removed.

In this way, a word sheet having word strips whose back and side surfaces are surrounded by permalloy is obtained.

This word sheet and a tunnel sheet are piled and stuck together, and a magnetic plated wire is inserted into a tunnel. Then, the terminals are soldered to form a memory plane. In this memory plane, the output is increased by about 40 percent compared with the one from the plane without a keeper when the word current and the digit current are the same, and the output is increased by about 20 percent compared with the one from the plane having only one keeper on the back surface (such as the one shown in FIG. 1).

Figure 1:
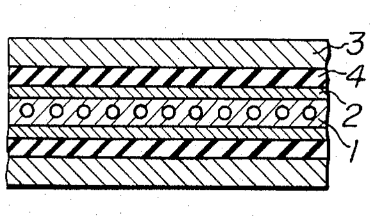
FIG. 1 PRIOR ART
FIG. 1 shows a sectional diagram of a conventional wire memory plane.

In the structure shown in FIG. 1, the extension of a magnetic rield gap is 1.2 mm when the word strip is 0.7 mm wide, while the extension is 1.0 mm when the word strip is 0.7 mm wide. Thus, it is understood that the word pitch can be reduced by about 20 percent and the memory density may be expanded by that amount.

We claim:

1. A method of making a wire memory plane, comprising the steps of forming a laminate consisting of an electrically conductive layer and a high magnetic permeability layer and an insulating flexible sheet in a sandwich structure with said conductive layer and said insulating sheet having exposed surfaces and sandwiching said magnetic layer therebetween, masking the conductive layer with a resist to form such a pattern that strips are arranged in parallel relation, using the same resist pattern and in the same etching step etching the electrically conductive layer and the high magnetic permeability layer to form a plurality of spaced conductors each having a magnetic strip associated therewith, depositing a high magnetic permeability material on the sides of the etched conductors and magnetic strips, then removing the strip-like pattern resist from the conductive layer to form word strips, and facing uncovered surfaces of the electrically conductive layer resulting from the preceding step to an insulating sheet into which digit lines are embedded in parallel relation to thereby form a matrix composed of the word strips and the digit lines.

2. The method according to claim 1, in which said electrically conductive layer is copper foil.

3. The method according to claim 1, wherein the step of depositing a high magnetic permeability material on the sides includes depositing the high magnetic permeability material on the resultant etched side portions of the electrically conductive layer and the high magnetic permeability layer such that the electrically conductive layer is surrounded on three sides thereof by high magnetic permeability material and has the pattern resist on the fourth side thereof.

4. The method according to claim 3, further including depositing the high magnetic permeability material on the side portions of the etched high magnetic permeability layer and electrically conductive layer so as to provide a spacing between adjacent side portions of the word strips.

* * * * *